United States Patent
Knapp et al.

(10) Patent No.: US 7,564,664 B2
(45) Date of Patent: Jul. 21, 2009

(54) ESD PROTECTION CIRCUIT FOR A HIGH FREQUENCY CIRCUIT

(75) Inventors: Herbert Knapp, München (DE); Hans-Dieter Wohlmuth, München (DE)

(73) Assignee: Infineon Technologies AG, Munich (DE)

( * ) Notice: Subject to any disclaimer, the term of this patent is extended or adjusted under 35 U.S.C. 154(b) by 30 days.

(21) Appl. No.: 11/432,081

(22) Filed: May 11, 2006

(65) Prior Publication Data
US 2007/0263330 A1    Nov. 15, 2007

(51) Int. Cl.
*H02H 9/00* (2006.01)
*H02H 3/22* (2006.01)
*H02H 1/04* (2006.01)
*H02H 9/06* (2006.01)
*H01C 7/12* (2006.01)

(52) U.S. Cl. .............. 361/56; 361/58; 361/111; 361/119

(58) Field of Classification Search .......... None
See application file for complete search history.

(56) References Cited

U.S. PATENT DOCUMENTS

| | | | |
|---|---|---|---|
| 5,416,660 A * | 5/1995 | Shiga | 361/111 |
| 6,731,184 B1 * | 5/2004 | Muto et al. | 333/103 |
| 6,847,511 B2 * | 1/2005 | Ohnakado et al. | 361/56 |
| 6,987,984 B1 * | 1/2006 | Kemmochi et al. | 455/552.1 |
| 7,146,137 B2 * | 12/2006 | Namura | 455/78 |

* cited by examiner

*Primary Examiner*—Albert W Paladini
*Assistant Examiner*—Dharti H Patel
(74) *Attorney, Agent, or Firm*—Dicke, Billig & Czaja, PLLC

(57) ABSTRACT

An ESD protection circuit is disclosed. In one embodiment, the ESD circuit is coupled to at least one signal transmission line and a positive and negative supply voltage of an integrated circuit, and includes at least one ESD-element connected between the signal transmission line and either one of the positive or negative supply voltages. At least one high-frequency transmission line is connected in series to the ESD-element and dimensioned in such a way that, at a predetermined high-frequency of a signal, an impedance of the current-path via the ESD-element is transformed, compared with the system impedance, from a low impedance to a very high impedance.

10 Claims, 13 Drawing Sheets

ESD PROTECTION CIRCUIT FOR A HIGH FREQUENCY CIRCUIT

BACKGROUND

As generally known, ESD protection circuits are essential for protecting integrated circuits from high-voltages caused by transient discharge. Such high-voltage transients can be induced by specific ESD events, i.e., through contact from one's fingertips or even during the manufacturing process of integrated circuits. For instance, a person can generate very high voltages of a few hundred and up to a few thousand Volts by simply moving over a carpet.

Moreover, there is an increasing tendency to apply exchangeable IC's in nowadays electronic systems. Thus, only a minimal number of IC's need to be replaced instead of the whole circuit board in order to upgrade, for example, microprocessors or memory cards. Therefore, adequate ESD protection for integrated circuits is essential in order to avoid damages.

Conventional ESD protection circuits are usually integrated between an IC input pin, also known as pad, and the IC itself, providing a current path that ensures that the voltage applied to the IC clearly stays below a specific critical limit.

However, conventional ESD protection circuits, whether internal on a chip or in an external device, are often not suitable for high-frequency (RF) applications, due to the adverse impact such ESD protection approaches have on the performance of a given high-frequency (RF) device. Also, standard circuits operating at low frequencies or at low speeds are relatively insensitive to the parasitic resistance, capacitance and inductance introduced by use of standard ESD protection circuits.

For example, FIG. 1 illustrates a conventional ESD protection circuit comprising two diodes used as ESD-elements (D1, D2), wherein the signal input pad of an integrated circuit is directly coupled to the ESD-elements (D1, D2). Although, the ESD-elements represent a parasitic capacitance that could affect the performance of the integrated circuit.

As a result, conventional ESD-elements can not be used at very high frequencies. For example, a parasitic capacitance of 100 fF would generate an impedance of a mere 20.7Ω at a frequency of 77 GHz.

FIG. 2 illustrates another conventional ESD protection circuit that does not use ESD-elements for critical high-frequency pads. Instead, a direct current path is provided between the pad and the supply voltage using, for example, an inductor or transmission line (L1), though, many applications prefer to avoid such a direct current path.

SUMMARY

The present invention provides an ESD protection circuit. In one embodiment, the ESD protection circuit is disclosed. In one embodiment, the ESD circuit is coupled to at least one signal transmission line and a positive and negative supply voltage of an integrated circuit, and includes at least one ESD-element connected between the signal transmission line and either one of the positive or negative supply voltages. At least one high-frequency transmission line is connected in series to the ESD-element and dimensioned in such a way that, at a predetermined high-frequency of a signal, an impedance of the current-path via the ESD-element is transformed, compared with the system impedance, from a low impedance to a very high impedance.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

Figure 1:
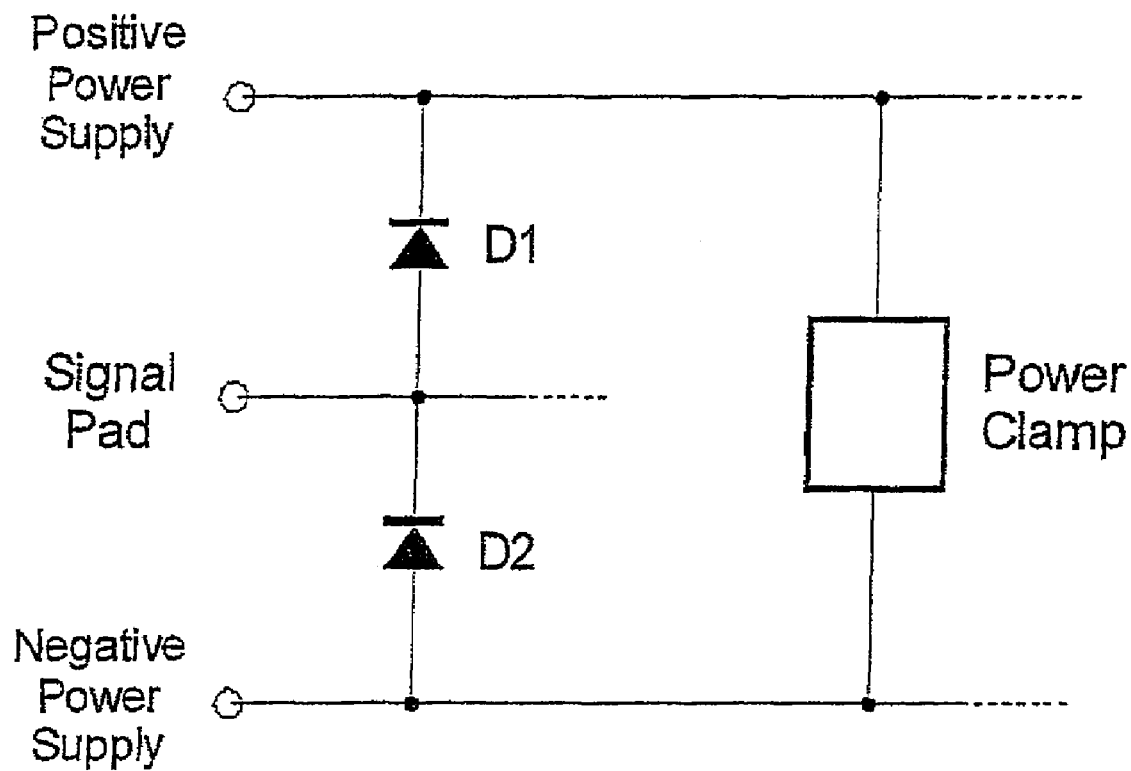
FIG. 1 illustrates a conventional ESD protection circuit for low frequencies.
Figure 2:
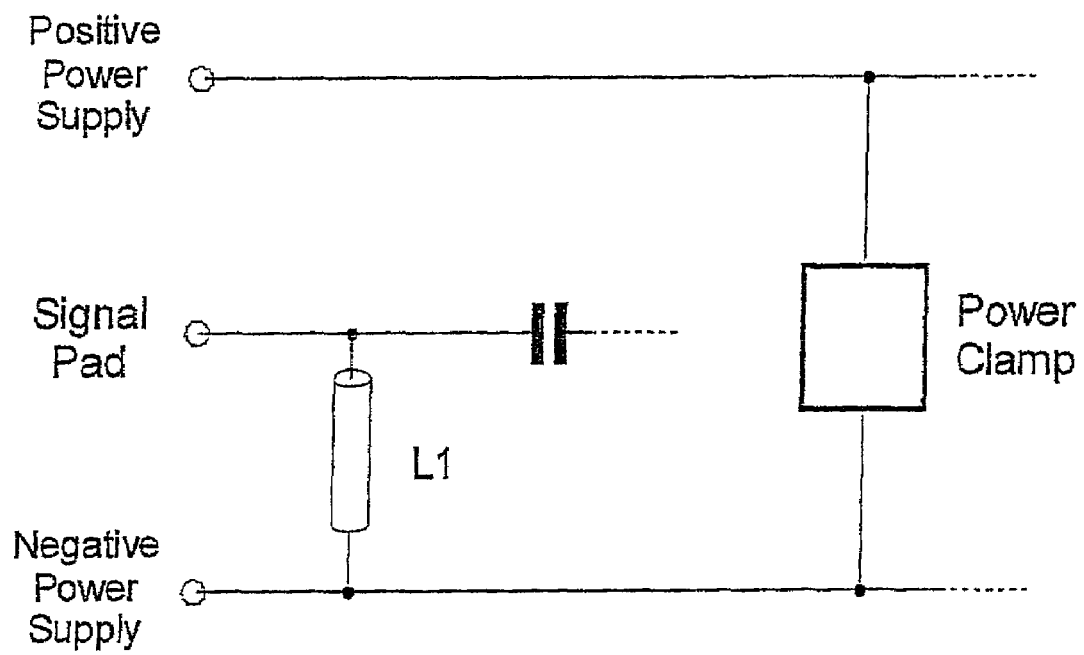
FIG. 2 illustrates a conventional ESD protection circuit without ESD-elements coupled to the critical high-frequency pads.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be noted that although the present invention is described with reference to the embodiments as illustrated in the following detailed description and in the accompanying drawings, the detailed description, as well as the drawings, are not intended to limit the present invention to the particular embodiments disclosed therein, but rather, the described embodiments merely exemplify the various aspects of the present invention, the scope of which is defined by the appended claims.

The present invention provides an ESD protection circuit that does not show any of the disadvantages mentioned above when operating at high frequencies.

The present invention provides an impedance matching network and a semiconductor device comprising an ESD protection circuit that does not show any of the disadvantages mentioned above when operating at high frequencies.

In one embodiment, the present invention provides an ESD protection apparatus, coupled to at least one signal transmission line and a positive and negative supply voltage of an integrated circuit, having at least one ESD-element connected between the signal transmission line and either one of the positive or negative supply voltages, wherein at least one high-frequency transmission line is connected in series to the ESD-element and dimensioned in such a way that, at a predetermined high-frequency of a signal, an impedance of the current path via the ESD-element is transformed, compared with the system impedance, from a low impedance to a very high impedance.

The present invention further provides an impedance matching network for an integrated circuit, matching the impedance between a signal input and the integrated circuit, wherein the compensation network is integrated in an ESD protection circuit of the present invention in such a way that, the function of at least one inductance of the compensation network is provided by the at least one high-frequency transmission line of the ESD protection circuit.

In another embodiment, the present invention provides a semiconductor device, having an integrated circuit, at least one signal input pad and/or signal output pad, at least one signal transmission line between the input pad and/or output pad and the integrated circuit, and an ESD protection circuit of the present invention.

One feature of the present invention is that a high-frequency transmission line, having a predefined length, decouples the ESD-elements from the high-frequency signal pad and, at a predetermined high-frequency of the signal, transforms the impedance, compared with the system impedance, from a low impedance (short circuit) to a very high impedance (open circuit) so that the performance of the integrated circuit is not affected in any way.

In a first embodiment of the present invention, at least two ESD-elements are connected in series between a positive and a negative supply voltage and coupled to the signal transmission line and eventually the IC via a high-frequency transmission line that is coupled to the signal transmission line and an interception node between the at least two ESD-elements. Thereby, negative and positive high-voltage transients caused by ESD events can be lead off the signal transmission line.

Furthermore, in another embodiment, a parallel-capacitor is coupled in parallel to one of the at least one ESD-elements and connected to the high-frequency transmission line and either positive or negative supply voltage, wherein the capacitance of the parallel-capacitor is chosen in such a way that, at the predetermined high-frequency of the signal, the parallel-capacitor impedance is very low compared with the system impedance. This allows the use of a high-frequency transmission line with a length that is, for example, a quarter of the wavelength ($\lambda/4$) of the predetermined high-frequency.

Moreover, in another embodiment of the present invention, a coupling capacitor is coupled in series between the interception node of the signal transmission line and the high-frequency transmission line, and the integrated circuit allowing a D.C.-decoupling between the signal pad and the integrated circuit.

In another embodiment of the present invention, at least two signal transmission lines are connected to the integrated circuit and each coupled to the positive or negative supply voltage via a high-frequency transmission line. This allows sharing the existing ESD-elements for multiple signal pads, which could be very useful for the input and output of opposite phased signals.

Furthermore, the high-frequency transmission line is formed as microstrip or coplanar transmission line, allowing the available space in, for example, semiconductor circuits being utilized at a maximum.

In another embodiment of the present invention, an impedance matching network, matching the impedance between a signal input and the integrated circuit, is integrated in the ESD protection circuit of the present invention in such a way that, the function of at least one inductance of the impedance matching network is provided by at least one high-frequency transmission line of the ESD protection circuit, and wherein the length of the high-frequency transmission line is not equal to a quarter of a wavelength ($\lambda/4$) of the predetermined high-frequency. This allows simultaneous impedance matching and ESD protection using only one circuit, thereby saving components, space and eventually costs.

In yet another embodiment, the ESD protection circuit of the present invention is integrated in a semiconductor device, comprising an integrated circuit, at least one signal input pad and/or signal output pad, at least one signal transmission line between the signal input pad and/or signal output pad, and the integrated circuit, wherein the ESD protection circuit is connected between the integrated circuit of the semiconductor device and the input- and/or output pads of the semiconductor device, providing a semiconductor device that is protected from high-voltage transients without the above mentioned adverse effects when operated at high frequencies (RF).

Furthermore, in another embodiment, the impedance matching network is integrated in a semiconductor device, comprising an integrated circuit, at least one signal input pad and/or signal output pad, at least one signal transmission line between the signal input pad and/or signal output pad, and the integrated circuit, wherein the impedance matching network is connected between the integrated circuit of the semiconductor device and the input- and/or output pads of the semiconductor device, providing a semiconductor device that includes impedance matching and that is protected from high-voltage transients without the above mentioned adverse effects when operated at high frequencies (RF).

Further characteristics of the invention and advantages thereof will be evident from the following detailed description of embodiments of the invention and the accompanying FIGS. 1 to 13, which are given by way of illustration only, and thus are not limitative of the present invention.

Figure 3:
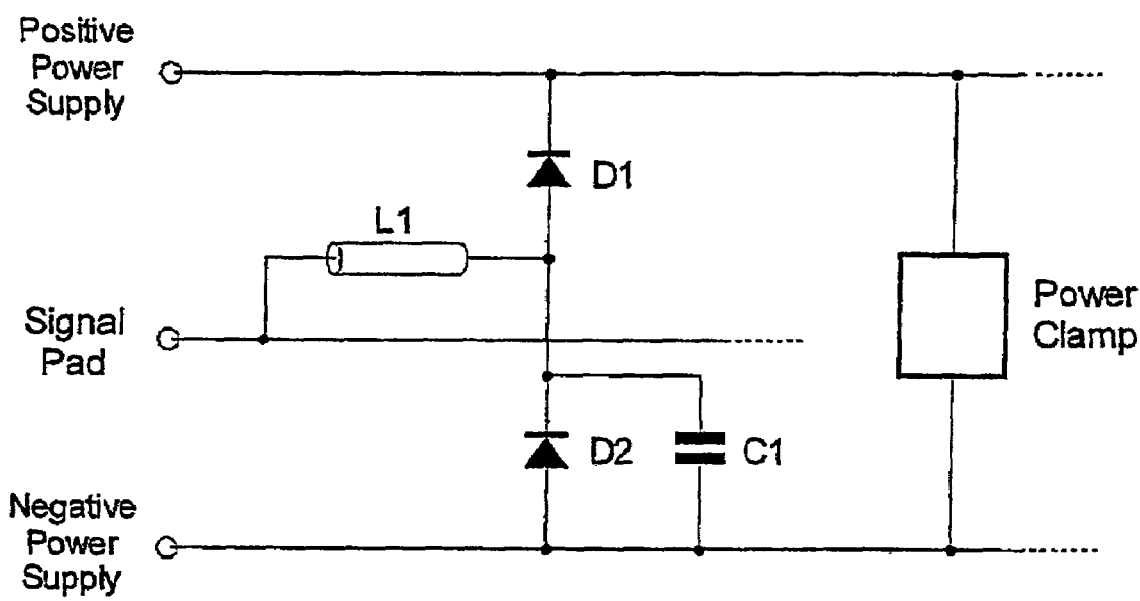
FIG. 3 illustrates a preferred embodiment of the present invention including two ESD-elements and an additional parallel-capacitor.

FIG. 3 illustrates one embodiment of a circuit for ESD protection using a high-frequency transmission line L1, two ESD-elements D1, D2 and a parallel capacitor C1. Here, the ESD-elements D1 and D2 are not directly coupled to a signal pad of a signal transmission line, but via a high-frequency transmission line L1. In addition, a parallel-capacitor C1 is provided having a capacity suitable to cause a short-circuit at a predetermined high-frequency of a signal. The length of the high-frequency transmission line L1 corresponds to a quarter of a wavelength (λ/4) of the predetermined high-frequency causing an impedance transformation from a short-circuit to an open-circuit, because it is shown that for the reflection factor Γ against the electrical length Θ:

$$\Gamma(\Theta) = \Gamma_L exp(-j2\Theta)$$

Figure 4:
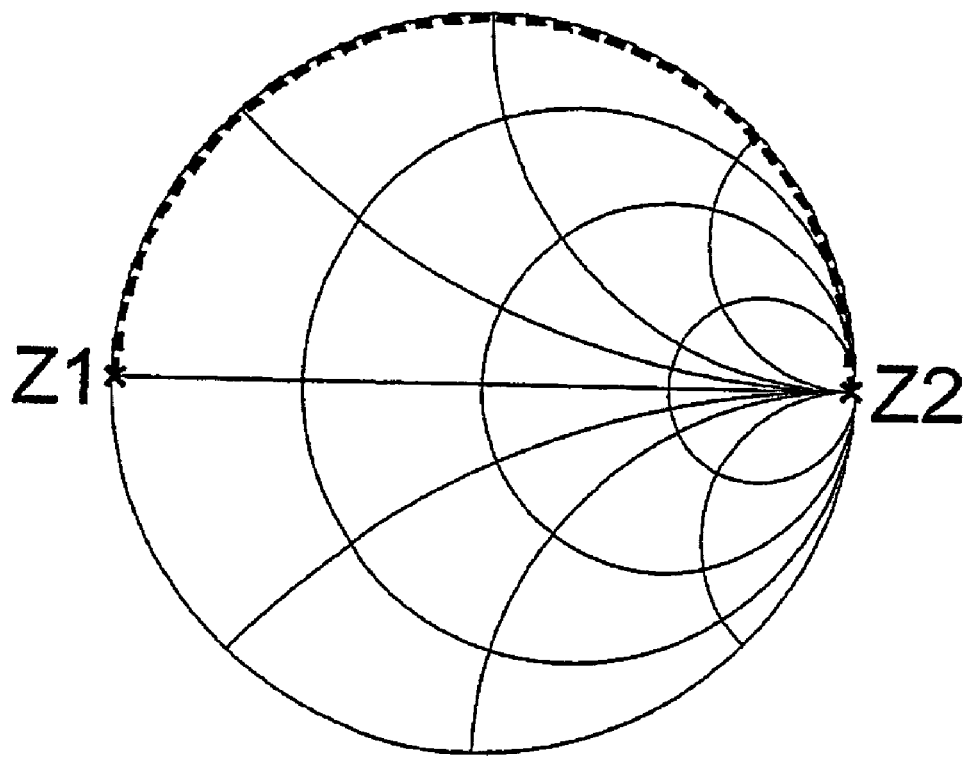
FIG. 4 illustrates a Smith-diagram of an impedance transformation from a short-circuit to an open-circuit.

FIG. 4 illustrates a Smith diagram of an impedance transformation from a short-circuit (Z1) to an open-circuit (Z2). In an ideal case, the short-circuit impedance Z1 would be close to zero and the open-circuit impedance Z2 would be close to infinity. However, in practical applications, Z1 is more likely to be a very low impedance and Z2 is more likely to be a very high impedance, compared with the system impedance.

Referring to the above example, if the length of the high-frequency transmission line L1 is λ/4 of the high-frequency of the signal, the short-circuit characteristics (Z1) of the parallel-capacitor C1 are transformed to open-circuit characteristics (Z2). Thus, the open-circuit is affecting the function of the integrated circuit insignificantly.

A simple numerical example shows that a high-frequency of 77 GHz and an effective dielectric constant $\in_{r,eff}$ of 3.9 results in a length of 493 μm for the high-frequency transmission line L1.

Figure 5:
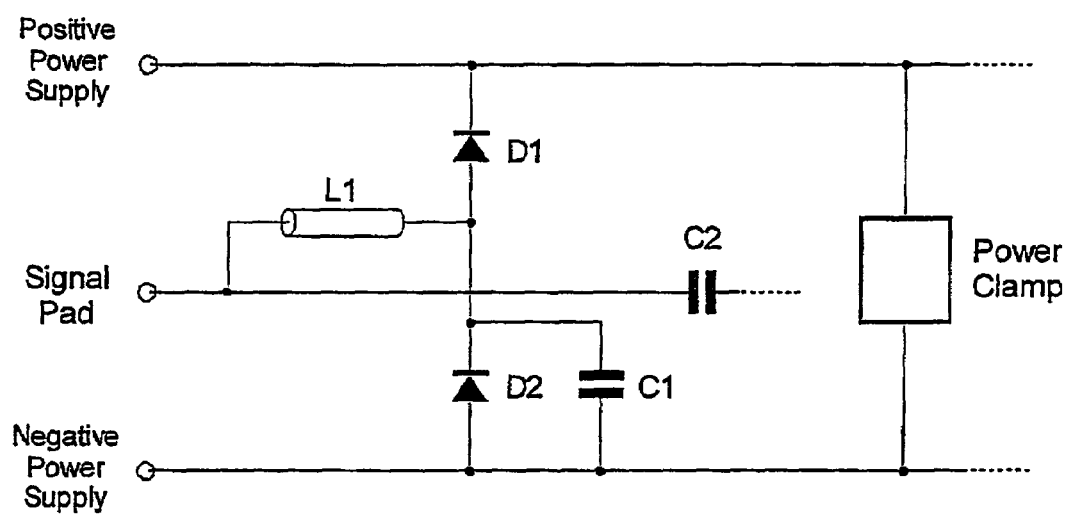
FIG. 5 illustrates another embodiment of the present invention including an additional coupling-capacitor enabling D.C. decoupling between the signal pad and the integrated circuit.

FIG. 5 illustrates another embodiment of the present invention. An additional coupling-capacitor C2 that is coupled in series between an interception node of the signal transmission line and the high-frequency transmission line L1, and the integrated circuit causes a D.C. decoupling between the signal pad and the integrated circuit.

Figure 6:
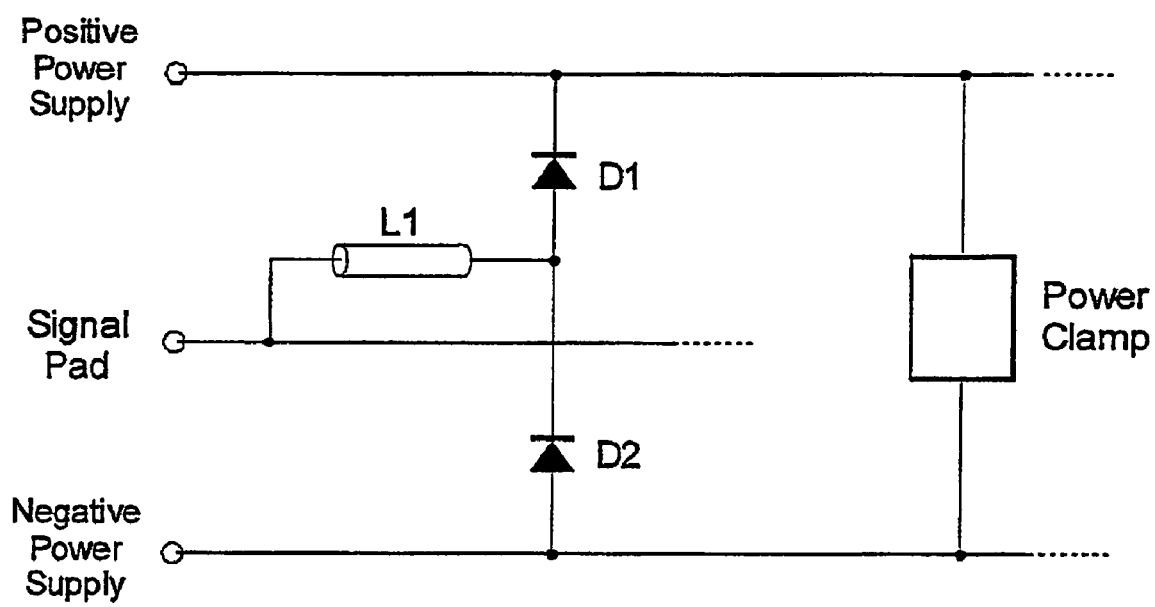
FIG. 6 illustrates another embodiment of the present invention, with the ESD-element being modeled as low-loss capacitors.
Figure 7:
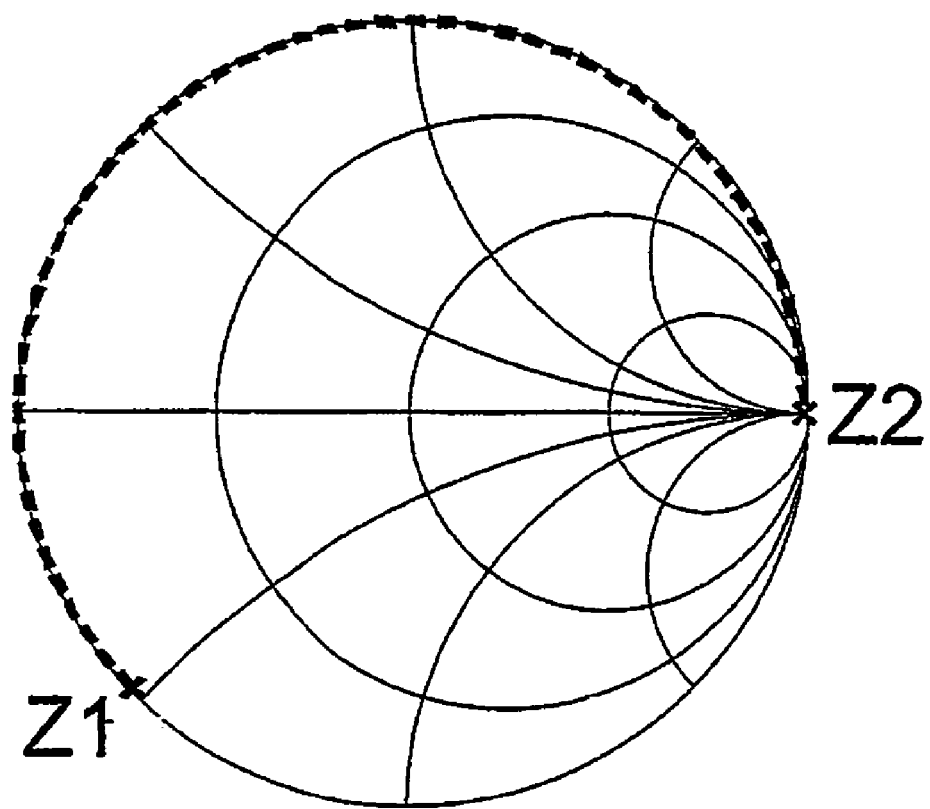
FIG. 7 illustrates a Smith-diagram of an impedance transformation from a capacitive Impedance to an open-circuit, wherein the length of the high-frequency transmission line is greater than λ/4.

FIG. 6 illustrates a further embodiment of the invention with the two ESD-elements D1 and D2 being modeled as low-loss capacitors making the need for a parallel-capacitor unnecessary. The Smith diagram in FIG. 7 illustrates a capacitive impedance Z1 of the ESD-elements that is transformed to an open-circuit impedance Z2 using a high-frequency transmission line L1 with a length greater than λ/4.

A simple numerical example shows that a total capacity of 100 fF for the ESD-elements in a 50Ω system results in a normalized impedance of (0−j0.413), which in turn corresponds to a phase of −135° for the reflection factor. Hence, in order to transform the impedance to open-circuit characteristics, an electrical length of 112.5° is required for the high-frequency transmission line L1, which in turn corresponds to a length of 616.5 μm for the high-frequency transmission line L1 at an effective dielectric constant $\in_{r,eff}$ of 3.9.

Figure 8:
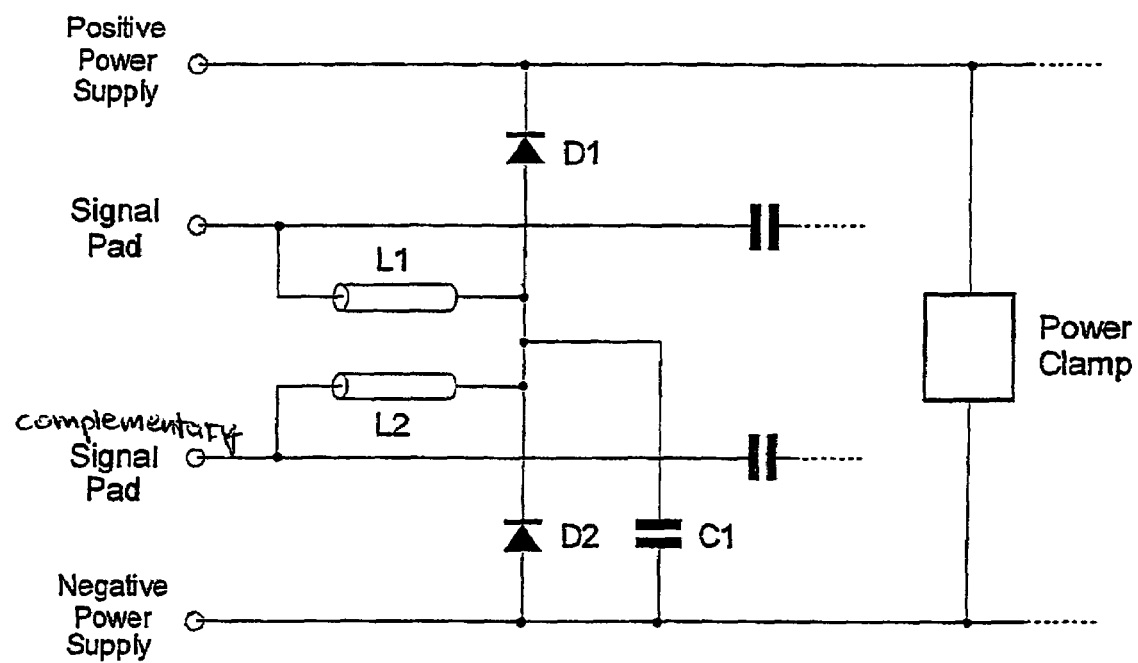
FIG. 8 illustrates another embodiment of the present invention comprising two signal transmission lines between two signal pads and the integrated circuit, sharing two ESD-elements and a parallel-capacitor.

FIG. 8 illustrates yet another embodiment of the present invention, wherein the ESD-elements D1, D2 and a parallel-capacitor C1 are shared by multiple signal pads using multiple signal transmission lines that are coupled to the ESD-elements D1, D2 via multiple high-frequency transmission lines L1, L2, respectively. The example shown in FIG. 8 is particularly advantageous for input- and output pads transmitting opposite phased signals, because the parallel-capacitor can be omitted due to a virtual zero-point at the interception node of the high-frequency transmission lines L1 and L2.

Figure 10:
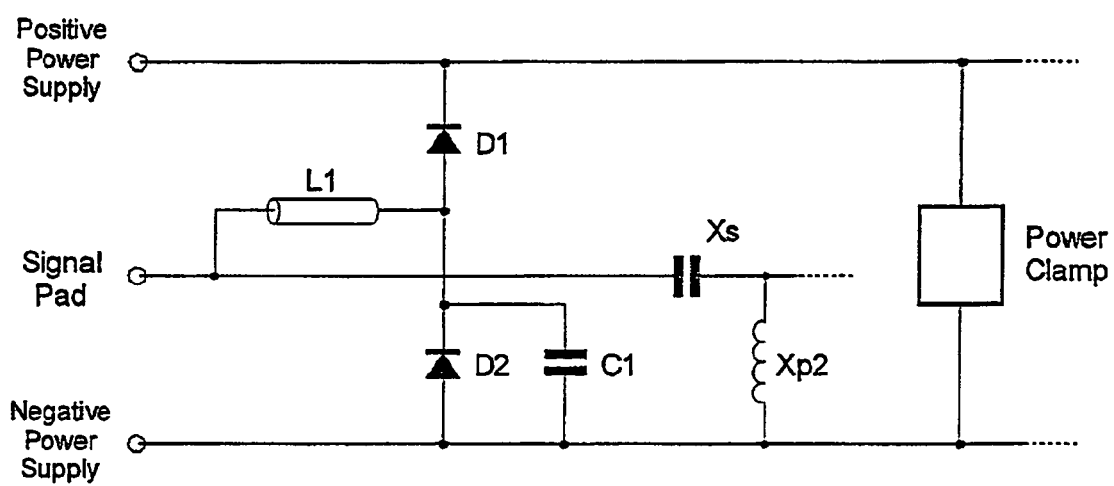
FIG. 10 illustrates another embodiment of the present invention, wherein the impedance matching network is integrated into an ESD protection circuit.
Figure 11:
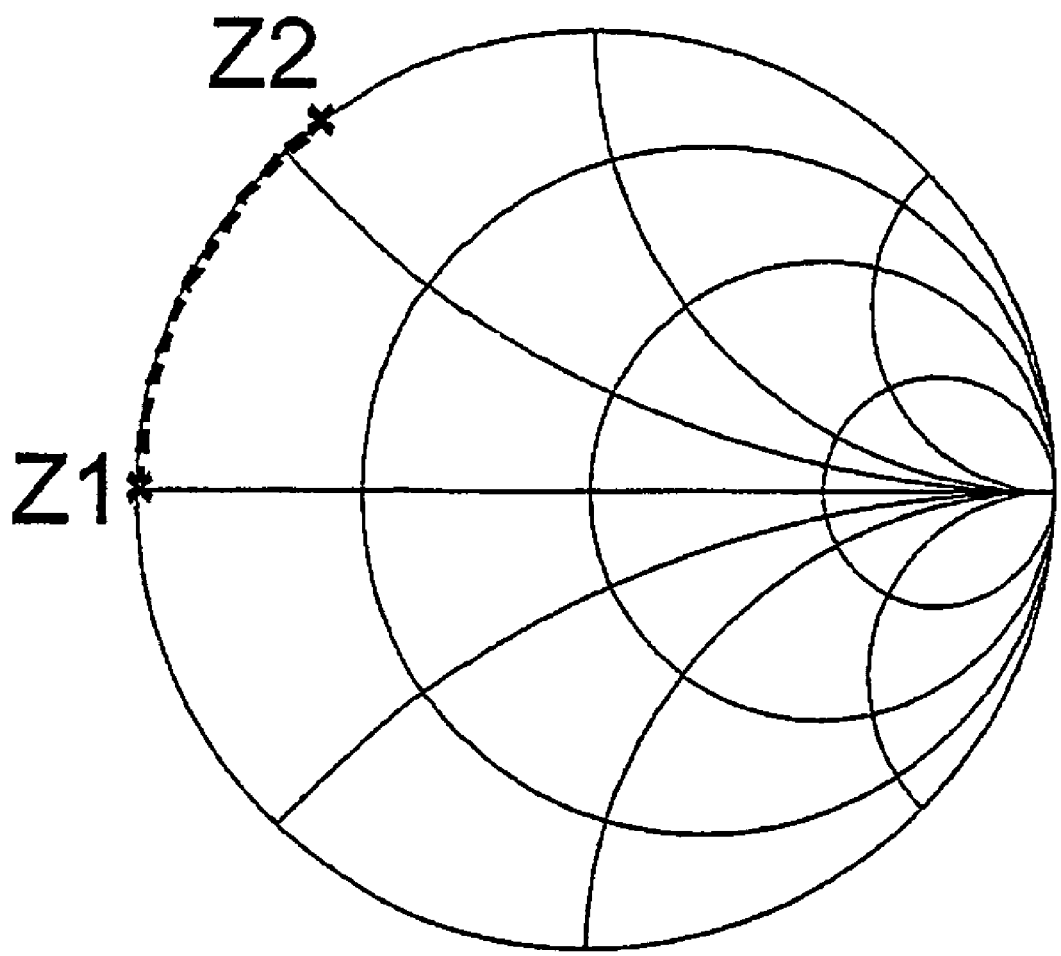
FIG. 11 illustrates a Smith-diagram of an impedance transformation from a low impedance to a higher impedance, wherein the of the high-frequency transmission line is less than λ/4, causing inductive characteristics.

Another embodiment of the present invention is shown in FIG. 10. In various applications of integrated microwave circuits, impedance matching networks are used to match different impedances using inductances, capacitors and transmission lines. In the example illustrated in FIG. 10, a high-frequency transmission line L1 is integrated within the impedance matching network in such a way that, the function of at least one inductance of the impedance matching network is provided by the high-frequency transmission line L1. The length of the high-frequency transmission line L1 is not equal to λ/4 of the predetermined high-frequency of the signal. The Smith diagram in FIG. 11 shows that inductive characteristics (Z2) are attained by using a length of the high-frequency transmission line L1 that is less than λ/4.

Figure 9:
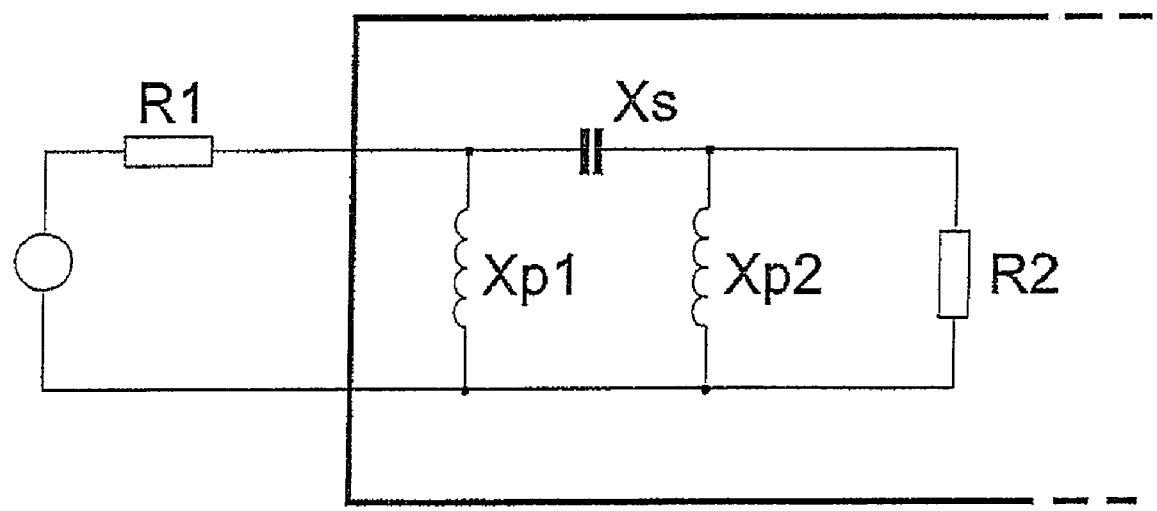
FIG. 9 illustrates an example of a conventional impedance matching network, comprising two inductances and a capacitor.

FIG. 9 illustrates an example of a conventional impedance matching network, comprising two inductances (impedance Xp1 and Xp2) and one capacitor (impedance Xs). It is shown that:

$$Xp1 = \frac{R1}{Q},$$

$$Xp2 = R2 \cdot \left[ \frac{R1/R2}{Q^2 + 1 - R1/R2} \right]^{1/2},$$

$$Xs = \frac{QR1 + R1R2/Xp2}{Q^2 + 1}.$$

Here, R1 represents the source resistance, R2 represents the load resistance and Q represents the Q-factor (quality factor) of the impedance matching network. Another simple numerical example shows that with a frequency of 77 GHz, a source resistance of 50Ω, a load resistance of 25Ω and a Q-factor of 2:

Xp1=25Ω, equivalent to 51.7 pH;

Xp2=20.41Ω, equivalent to 42.2 pH; and

Xs=32.25Ω, equivalent to 64.1 fF.

The impedance Xp1 can then be realized by using the high-frequency transmission line L1. The required length Θ is determined with the following equation:

$$X = Z_0 \tan \Theta$$

Hence, the result for the electrical length is 26.6° at an impedance $Z_0$ of 50Ω, leading to a length of 145.5 μm at an effective dielectric constant $\in_{r,eff}$ of 3.9.

Figure 12:
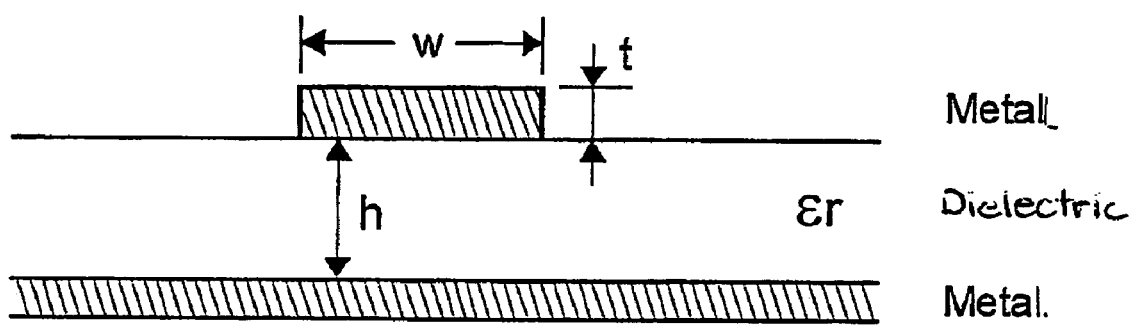
FIG. 12 illustrates schematically a microstrip transmission line.

Furthermore, the high-frequency transmission lines and/or all other transmission lines of the present invention can be designed as microstrip or coplanar transmission lines. FIG. 12 illustrates schematically the principle design of a microstrip transmission line, comprising a transmission line and an earthed area, separated by a dielectric. Also, the dimensions of the microstrip transmission line are represented by the line width w, the height of the metal conductor t and the height of the dielectric h. Thus, the performance of the microstrip transmission line is characterized by the impedance and the effective dielectric constant $\in_{r,eff}$. For example, if w/h<1:

$$Z_0 = \frac{60}{\sqrt{\varepsilon_{r,eff}}} \ln[8h/w + w/(4h)]$$

$$\varepsilon_{r,eff} = \frac{\varepsilon_r + 1}{2} + \frac{\varepsilon_r - 1}{2}[(1 + 12h/w)^{-1/2} + 0.04(1 - w/h)^2]$$

Figure 13:
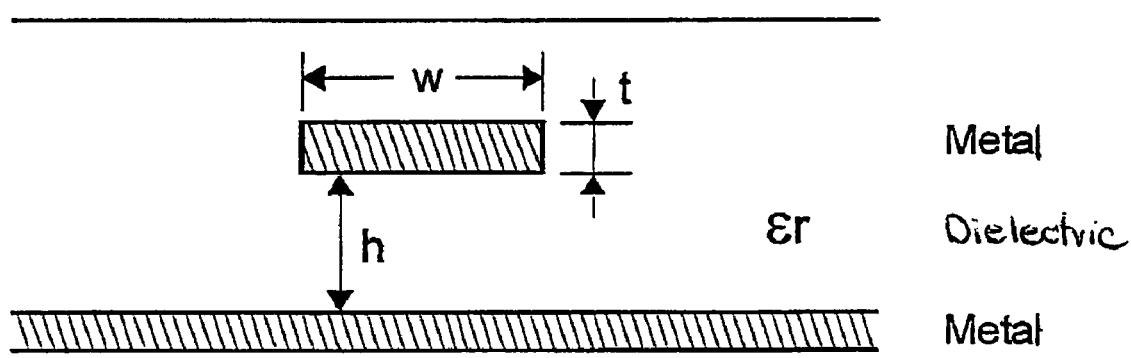
FIG. 13 illustrates a slightly modified microstrip transmission line.

Also, modified microstrip transmission lines are frequently used in integrated circuits, in which the transmission line is fully emerged in the dielectric as shown, for example, in FIG. 13. Here, the dielectric is made primarily of silicon oxide having a dielectric constant $\in_r$ of 3.9. Provided that the electric field is located entirely within the dielectric, the effective dielectric constant $\in_{r,eff} = \in_r$. Consequently, the velocity of propagation v for the transmission line is determined by:

$$v = c_0 / \sqrt{\in_{r,eff}},$$

and the wavelength λ is determined by:

$$\lambda = \frac{c_0}{f\sqrt{\varepsilon_{r,eff}}}.$$

Here, $c_0$ represents the speed of light in open space and f represents the frequency. Another simple numerical example shows that the wavelength λ is 1.972 mm for a frequency of 77 GHz and an effective dielectric constant of 3.9.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An ESD protection circuit, coupled to at least a first and a second signal transmission line and a positive and a negative supply voltage of an integrated circuit, comprising:
    at least a first and a second high-frequency transmission line, the first high-frequency transmission line having a first end connected to the first signal transmission line and the second high-frequency transmission line having a first end coupled to the second signal transmission line; and
    at least one ESD-element connected between second ends of the first and second high-frequency transmission lines and either one of the positive or negative supply voltages such that the first and second high-frequency transmission lines are each connected in series with the ESD-element and dimensioned in such a way that, at a predetermined high-frequency of a signal of the integrated circuit, an impedance of a current-path formed by the first high-frequency transmission line and the at least one ESD-element and a current path formed by the second high-frequency transmission line and the ESD-element are transformed compared with a system impedance, from a low impedance to a very high impedance.

2. The ESD protection circuit according to claim 1, further comprising:
    a parallel-capacitor coupled in parallel with the at least one ESD-element between the second end of the at least one high-frequency transmission line and the positive or negative supply voltage, wherein a capacity of the parallel-capacitor is chosen in such a way that, at the predetermined high-frequency of the signal of the integrated circuit, the parallel-capacitor impedance is very low compared with the system impedance, allowing the length of the high-frequency transmission line to be a quarter of the wavelength (λ/4) of the predetermined high-frequency.

3. The ESD protection circuit according to claim 2, further comprising:
    a coupling-capacitor coupled in series between an interception node where the at least one signal transmission line is connected to the first end of the at least one high-frequency transmission line, and the integrated circuit.

4. The ESD protection circuit according to claim 1, comprising wherein at least one high-frequency transmission line is formed as a microstrip transmission line or a coplanar transmission line.

5. The ESD protection circuit according to claim 1, comprising at least two ESD-elements, one coupled between the second end of the high-frequency transmission line and the positive supply voltage, and another coupled between the second end of the high-frequency transmission line and the negative supply voltage.

6. An impedance matching network for an integrated circuit, matching the impedance between a signal input and the integrated circuit, comprising:
    an ESD protection circuit, coupled to at least a first and a second signal transmission line and a positive and a negative supply voltage of an integrated circuit, comprising:
        at least a first and a second high-frequency transmission line, the first high frequency transmission line having a first end coupled to the first signal transmission line and the second high frequency transmission line having a first end coupled to the second signal transmission line; and
        at least one ESD-element connected between either one of the positive or negative supply voltages and second ends of the first and second high frequency transmission lines, wherein the first and second high-frequency transmission lines are each connected in series to the ESD-element and dimensioned in such a way that, at a predetermined high-frequency of a signal of the integrated circuit, an impedance of a current-path formed by the first high-frequency transmission line and the ESD-element and of a current path formed by the second high frequency transmission line and the ESD-element are transformed, compared with a system impedance, from a low impedance to a very high impedance,
    wherein the impedance matching network is integrated in the ESD protection circuit in such a way that the function of at least one inductance of the impedance matching network is provided by one of the first and second high-frequency transmission lines of the ESD protection circuit.

7. The impedance matching network according to claim 6, comprising wherein the length of the first and second high-frequency transmission lines is not equal to a quarter of a wavelength (λ/4) of the high-frequency of the signal.

8. A semiconductor device, comprising:
    an integrated circuit having positive and negative supply voltages;
    at least a first and second signal input pad and/or signal output pad;
    at least a first signal transmission line between the first signal input pad and/or signal output pad and the integrated circuit and a second signal transmission line between the second signal input pad and/or signal output pad and the integrated circuit, and
    an ESD protection circuit, coupled to the at least and second signal transmission lines and the positive and negative supply voltages, comprising:
        at least a first and a second high frequency transmission line, the first high frequency transmission line having a first end coupled to the first signal transmission line and the second high frequency transmission line having a first end coupled to the second signal transmission line; and a first ESD-element connected between a second end of the first high-frequency transmission line and the negative supply voltage and a second ESD-element connected between a second end of the second high-frequency transmission line and the positive supply voltage, wherein the first high-frequency transmission line is connected in series with the first ESD-element and the second high-frequency transmission line in series with the second ESD-element and are dimensioned in such a way that, at a predetermined high-frequency of a signal of the integrated circuit, an impedance of a current path formed by the first high frequency transmission line and the first ESD-element and an impedance of a current path formed by the second high frequency transmission line and the second ESD-element are transformed, compared with a system impedance, from a low impedance to a very high impedance.

9. A semiconductor device, comprising:
an integrated circuit having positive and negative supply voltages;
at least a first and a second signal input pad and/or signal output pad;
at least a first signal transmission line between the first input pad and/or output pad, and the integrated circuit and a second signal transmission line between the second input pad and/or output pad, and the integrated circuit, and
an impedance matching network matching the impedance between a signal input and the integrated circuit, comprising:
an ESD protection circuit, coupled to the at least first and second signal transmission lines and the positive and negative supply voltages, comprising:
at least a first and a second high-frequency transmission line, the first high-frequency transmission line having a first end coupled to the first signal transmission line and the second high-frequency transmission line having a first end coupled to the second signal transmission line; and at least one ESD-element connected between second of the first and second high-frequency transmission line and either one of the positive or negative supply voltages such that the first and second high-frequency transmission lines are each connected in series with the at least one ESD-element and dimensioned in such a way that, at a predetermined high-frequency of a signal of the integrated circuit, an impedance of a current path formed by the first high-frequency transmission line and the at least one ESD-element and of a current path formed by the second high-frequency transmission line and the at least one ESD-element are transformed, compared with a system impedance, from a low impedance to a very high impedance, wherein the impedance matching network is integrated in the ESD protection circuit in such a way that the function of at least one inductance of the impedance matching network is provided by one of the first and second high-frequency transmission lines of the ESD protection circuit.

10. The ESD protection circuit according to claim 1, further comprising:
a parallel-capacitor coupled in parallel to at least one ESD-element and connected to at least one high-frequency transmission line and the positive or negative supply voltage, wherein a capacity of the parallel-capacitor is chosen in such a way that, at the predetermined high-frequency of the signal of the integrated circuit, the parallel-capacitor impedance is very low compared with the system impedance, allowing the length of the high-frequency transmission line to be a quarter of the wavelength ($\lambda/4$) of the predetermined high-frequency.

* * * * *

UNITED STATES PATENT AND TRADEMARK OFFICE
CERTIFICATE OF CORRECTION

PATENT NO. : 7,564,664 B2  Page 1 of 1
APPLICATION NO. : 11/432081
DATED : July 21, 2009
INVENTOR(S) : Knapp et al.

It is certified that error appears in the above-identified patent and that said Letters Patent is hereby corrected as shown below:

Column 7, line 48, delete "are transformed" and insert in place thereof --are transformed,--.

Column 10, line 5, delete "between second" and insert in place thereof --between seconds--.

Signed and Sealed this

Fourteenth Day of December, 2010

David J. Kappos
*Director of the United States Patent and Trademark Office*